Figure 1:
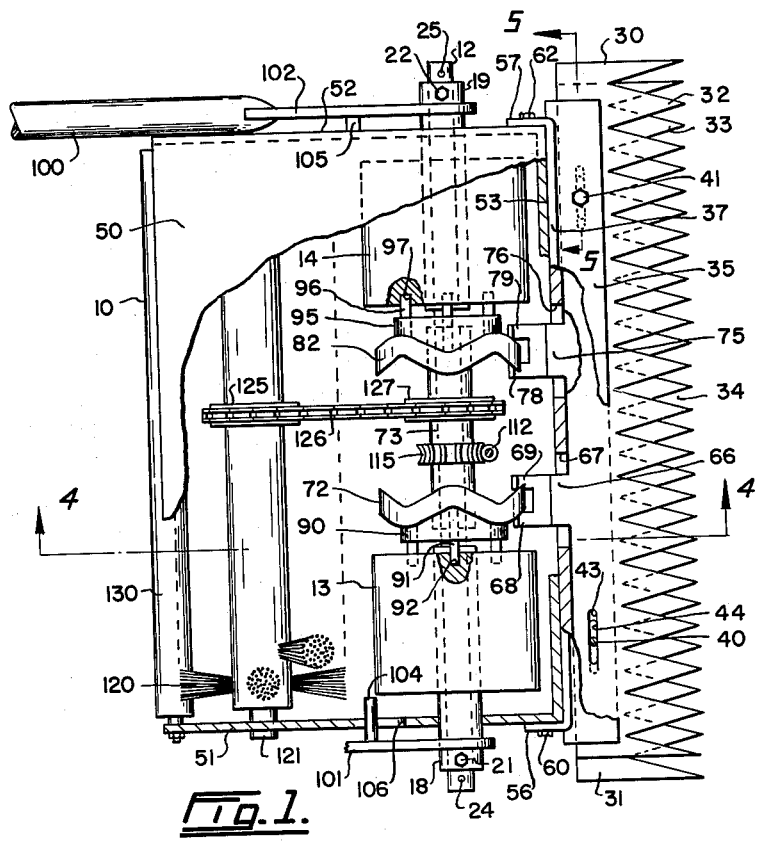

June 25, 1963

GA KEN LEE
FORMERLY KNOWN AS LEE GA KEN
GRASS AND PLANT MOWER 3,094,832

Filed July 1, 1960

2 Sheets-Sheet 1

INVENTOR
GA KEN LEE, formerly known as, Lee Ga Ken

BY
Featherstonhaugh & Co.
ATTORNEYS

June 25, 1963
GA KEN LEE
FORMERLY KNOWN AS LEE GA KEN
GRASS AND PLANT MOWER
3,094,832
Filed July 1, 1960
2 Sheets-Sheet 2
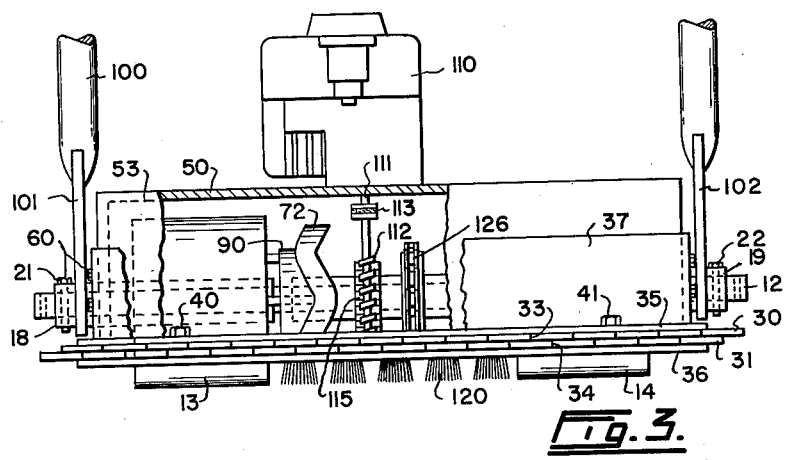
Fig. 3.
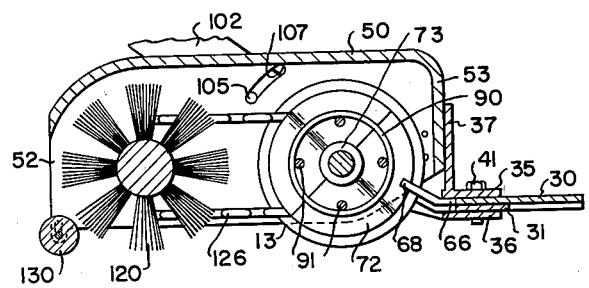
Fig. 4.
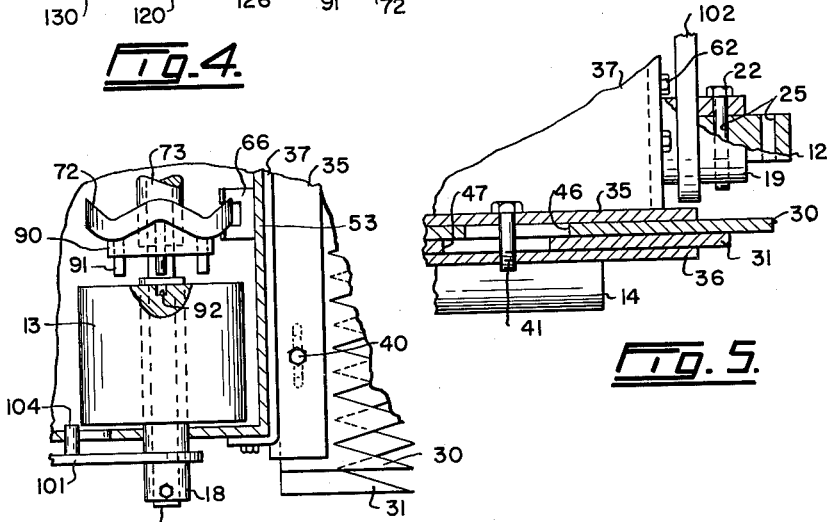
Fig. 5.
Fig. 6.
INVENTOR
GA KEN LEE, formerly known as, Lee Ga Ken
BY
*Featherstonhaugh & Co.*
ATTORNEYS

United States Patent Office 3,094,832
Patented June 25, 1963

3,094,832
GRASS AND PLANT MOWER
Ga Ken Lee, formerly known as Lee Ga Ken,
439 Powell St., Vancouver, British Columbia,
Canada
Filed July 1, 1960, Ser. No. 40,461
4 Claims. (Cl. 56—26.5)

This invention relates to a mower for grass and plants.

This application is a continuation-in-part of my application Serial Number 733,619, filed May 7, 1958, now abandoned.

An object of the present invention is the provision of a mower which may be used for cutting grass of any length and other plants.

Another object is the provision of a mower of extremely simple and inexpensive design.

A further object is the provision of a grass and plant mower which requires very little power for operation and, therefore, may be operated manually or by means of a suitable source of power, such as an electric motor or small gasoline engine.

A still further object is the provision of a mower having relatively reciprocal blades, and which may be completely manually operated, or may include power means for reciprocating the blades and/or moving the mower along the ground.

The present mower is particularly designed for domestic use, in which case, it is mainly used for cutting grass. However, the mower is such that it can be used to cut grass of any length, or any type of plant or weed. While being able to cut very rough vegetation, it also provides a very fine and even cut for lawns. It is also constructed so that it can cut over the edges of lawns, and right up to obstacles, such as walls, trees or the like.

The lawn mower in common use is a reel type. However, the reel mower cannot cut over the edge of a lawn, it cannot cut right up to objects, and it is no good for tall grass or plants. These and other objections apply to the commonly used rotary grass cutter.

A grass and plant mower according to the present invention comprises a shaft, a pair of horizontal relatively reciprocal blades suspended from the shaft, co-acting cutting teeth on and projecting forwardly from the blades, rollers mounted on the shaft and shiftable longitudinally thereof, operating means on the shaft and connected to at least one blade for reciprocating the latter relative to the other blade, clutch means on the rollers and the operating means, said clutch means being engaged to cause the rollers to rotate with the operating means when the rollers are in a first position on the shaft and being disengaged when said rollers are in a second position, and means selectively retaining the rollers in the first and second positions on the shaft.

Figure 2:
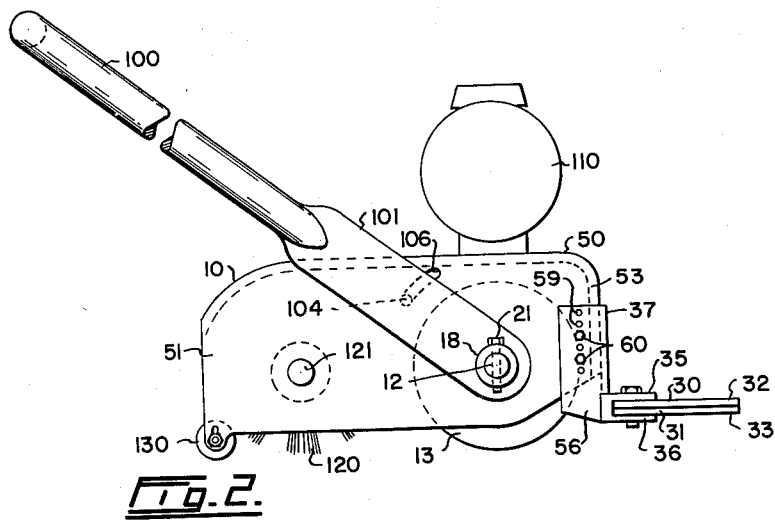

An example of this invention is illustrated in the accompanying drawings, in which, FIGURE 1 is a plan view of the mower with the clutch means engaged and with most of the upper platform thereof broken away, FIGURE 2 is a side elevation of the mower, including a power unit thereon, FIGURE 3 is a front elevation of the mower, with parts thereof broken away, FIGURE 4 is a section taken substantially on the line 4—4 of FIGURE 1, FIGURE 5 is an enlarged fragmentary section taken on the line 5—5 of FIGURE 1, and FIGURE 6 is a fragmentary plan view of one of the rollers in the clutch-disengaging position.

Referring to the drawings, 10 is a grass and plant mower having a horizontal shaft 12 upon which supporting rollers 13 and 14 are rotatably mounted. These rollers may be comparatively narrow so that they are substantially wheels, but it is preferable to make them relatively wide, as shown in FIGURE 1 to increase the transverse ground-engaging surface thereof. In the preferred form of the invention, rollers 13 and 14 are shiftable longitudinally of shaft 12, and means is provided for selectively retaining the rollers in either of two positions. In this example, rollers 13 and 14 have axial sleeves 18 and 19 projecting outwardly therefrom, and studs 21 and 22 are threaded in sleeves 18 and 19. Stud 21 is adapted to fit into either of two holes 24 in shaft 12 near one end thereof, while stud 22 is adapted to fit into either of two holes 25 in the shaft near the opposite end thereof.

A pair of horizontal cutting blades 30 and 31 having forwardly-projecting cutting teeth 32 and 33 are mounted at the front of this machine. These blades are mounted between vertically spaced horizontal plates 35 and 36 carried by a vertical backing plate 37. In other words, plates 35, 36 and 37 form carrying means for the blades. The blades are held in their proper positions by pins 40 and 41 fixedly positioned in upper and lower plates 35 and 36. Pin 40 extends through overlapping slots 43 and 44 in and extending longitudinally of blades 30 and 31 respectively, while pin 41 extends through similar slots 46 and 47 in said blades. Pin 41 and slots 46 and 47 are clearly shown in FIGURE 5. By referring to FIGURE 1, it will be seen that the cutting teeth are pointed and teeth 32 are staggered relative to teeth 33 so that inwardly-extending V-shaped openings 34 are formed therebetween.

A platform 50 is provided with downwardly-extending sides 51 and 52 that are carried by the ends of shaft 12. In this example, sleeves 18 and 19 which surround the shaft are journalled in sides 51 and 52. Platform 50 has an apron 53 depending from the forward edge thereof behind blades 30 and 31. Backing plate 37 overlaps and is movable relative to apron 53. Platform 50, sides 51 and 52, and apron 53 constitute a supporting framework, to which backing plate 37 is adjustably secured in any desired manner. In this example, backing plate 37 has flanges 56 and 57 projecting rearwardly from its ends and overlapping respectively walls 51 and 52. Flange 56 has a plurality of vertically arranged holes 59 therein through which one or more studs 60 extend and is or are threaded into the adjacent portion of wall 51. There are two studs 60 shown in FIGURE 2. These studs may be removed to permit flange 56, and consequently, blades 30 and 31 to be adjusted vertically relative to rollers 13 and 14 which carry the supporting frame. Flange 57 is similarly adjustably connected to side wall 52 by means of studs 62. Apron 53 and plate 37 form a transverse section while sides 51 and 52 form rearwardly-extending arms of said supporting frame.

One or both of the blades 30 and 31 is or are reciprocated horizontally in any convenient manner. In this example, blade 30 is formed with a tongue 66 projecting rearwardly through a slot 67 in backing plate 37, said tongue having spaced lugs 68 and 69 projecting rearwardly and inclined upwardly on opposite sides of a wavy cam wheel 72 fixedly mounted on a sleeve 73 which is rotatably mounted on shaft 12 centrally thereof. Similarly, blade 31 has a tongue 75 projecting rearwardly through a slot 76 in backing plate 37. Spaced lugs 78 and 79 project rearwardly and are inclined upwardly from this tongue on opposite sides of another wavy cam wheel 82 fixedly mounted on sleeve 73. The wavy undulations of cams 72 and 82 are such as to move the lugs 68—69 and 78—79 horizontally back and forth. It will be noted that the waves of one cam wheel are opposed to those of the other so that the pairs of lugs are moved in opposite directions, thereby oppositely reciprocating blades 30 and 31.

Cam wheels 72 and 82 and sleeve 73 form operating means for relatively reciprocating blades 30 and 31. Clutch means is provided on rollers 13 and 14 and this operating means by means of which the blades may be reciprocated by rotation of rollers 13 and 14. This clutch means is such that it is engaged to cause the rollers and operating means to rotate together when the rollers are in one position on shaft 12, and it is disengaged when said rollers are into another position on the shaft.

In this example, the clutch means for roller 13 includes a ring 90 fixedly secured to cam wheel 72 and extending around shaft 12. A plurality of pins 91 are secured to the cam wheel and/or ring 90 and project towards roller 13, said pins being adapted removably to fit into sockets 92 in this roller. When the roller 13 is in its inner position relative to shaft 12, pins 91 fit in sockets 92, see FIGURE 1, and when the roller is in its outer position, the pins are clear of the sockets and roller, as shown in FIGURE 6. Roller 13 is manually shifted between its inner and outer positions on shaft 12 when stud 21 is withdrawn from holes 24 of said shaft. Once the roller is in a selected position, stud 21 is inserted in the appropriate hole 24 to secure said roller in this position.

Similarly, a ring 95 is fixedly secured to and projects outwardly from cam wheel 82, and pins 96 are secured to this cam wheel and/or ring 95, projecting outwardly from the latter. Pins 96 are adapted removably to fit into sockets 97 in the adjacent end of roller 14. When this roller is moved to its outer position, pins 96 are clear of the roller and sockets 97. Roller 14 is free to be shifted manually between its inner and outer positions on shaft 12 when stud 22 is withdrawn from shaft holes 25, and this roller is retained in a selected position when the stud is inserted into the appropriate hole.

With the clutch means of rollers 13 and 14 in engagement (pins 91 and 96 in sockets 92 and 97), rotation of the rollers causes blades 30 and 31 to reciprocate, and rotation of the operating means, that is, cam wheels 72 and 82, causes the rollers to rotate.

Handle means is provided for mower 10, and it is preferable to connect the handle means to shaft 12 and to have it extending upwardly therefrom and back from the cutter blades. For this purpose, a handle 100 is provided having side members 101 and 102 which extend downwardly and forwardly, and are mounted either directly on the ends of shaft 12, or, as shown, on the portions of sleeves 18 and 19 which project beyond the frame sides 51 and 52. Pins 21 and 22 keep these arms from slipping off the ends of the sleeves. In order to limit the upward and downward movement of handle 100 relative to platform 50, arms 101 and 102 are provided with pins 104 and 105 which project inwardly therefrom into short arcuate slots 106 and 107 formed in side walls 51 and 52 and respectively.

The mower described so far is manually operated by means of handle 100. If the clutch means are engaged so that the rollers 13 and 14 are connected to cutting blades 30 and 31, movement of the mower causes the rollers to rotate and thereby reciprocate the blades. If the clutch means are disengaged, the mower will move, but the blades will not reciprocate.

Mower 10 is made into a power-driven mower by providing a suitable source of power 110 on platform 50. This source of power may be an electrical or gasoline engine. Suitable means is provided for connecting motor 110 with the cam wheels 72 and 82. In this example, the motor is mounted so that its drive shaft 111 extends downwardly through platform 50. A worm 112 is either directly connected to shaft 111, or it is connected thereto by means of a suitable coupling 113. Worm 112 meshes with a worm gear 115 fixedly mounted on sleeve 73.

With this arrangement, motor 110 drives cam wheels 72 and 82 through worm 113 and worm gear 115. Thus, the motor reciprocates blades 30 and 31, and if rollers 13 and 14 are connected to the cam wheels, said rollers are also rotated by the motor. On the other hand, if the rollers are disconnected from the cam wheels, the motor only reciprocates blades 30 and 31, and the mower would have to be moved manually. Thus, if a person wishes to have the blades power driven but prefers to move the mower manually, he can do so. This arrangement also permits the mower to be used manually should the motor cease to function. The motor may be disconnected from the cam wheels by undoing coupling 113.

If desired, sweeping means are provided on mower 10 in order to sweep the cuttings into a suitable catcher. In this example, a cylindrical brush or broom 120 has stub shafts 121 projecting from the ends thereof, said shafts being journalled in the sides 51 and 52 of platform 50 so that the brush is located immediately behind rollers 13 and 14. A suitable grass catcher, not shown, may be mounted on mower immediately behind brush 120. Since grass catchers and mounting means therefor are well known in the art, it is not necessary to illustrate and describe one herein.

This brush is operatively connected to shaft 12 in any convenient manner. For example, a sprocket 125 may be fixedly mounted on the brush centrally thereof, said sprocket being connected by a chain 126 to another sprocket 127 fixedly mounted on sleeve 73 between cam wheels 72 and 82. With this arrangement, rotation of the cam wheels either by rollers 13 and 14 and/or by motor 110 causes brush 120 to rotate at the same time.

The mower 10 is very simple and may function as a manually-operated machine. The operator grasping handle 100 pushes the machine forwardly, causing rollers 13 and 14, which carry the weight to rotate. This, in turn, rotates cam wheels 72 and 82, causing lugs 68—69 and 78—79 to be shifted back and forth so that cutter blades 30 and 31 are shifted in the same direction to produce relative movement between cutter teeth 32 and 33 to cut any grass or plants projecting upwardly therebetween. The height of the cut is adjusted by shifting backing plate 37 up or down on the supporting frame. As previously stated, one of the cutter blades may be stationary, while the other is movable relative thereto. In this case, only one cam wheel would be required.

It will be noted in FIGURE 1 that cutting blades 30 and 31 with their teeth 32 and 33 project laterally beyond the sides of mower 10. Rollers 13 and 14 are located inwardly of the ends of the blades so that said blade ends cut beyond the outer ends of the rollers. As a result of this, the mower may be run along the edge of the grass to cut the latter right up to said edge. Furthermore, the mower can be moved along a wall so that grass extending up to said wall may be cut. In addition to this, the mower may be moved forwardly until the cutter teeth practically touch an obstacle, such as a tree, in order to cut grass right up to the latter. The cutter teeth will cut any plant that projects upwardly therebetween regardless of the height of said plant. Therefore, this mower may be used in long grass or in weeds to cut them down to the level of the cutter blades.

As stated above, mower 10 may be manually or power operated. However, it is to be understood that it may be incorporated in or mounted on the front of a suitable powered carrier. In this case, the power unit of the mower may be omitted so that the latter functions in the same manner as it does when it is manually operated.

If desired, a roller 130 may be carried by frame sides 51 and 52 behind brush 120. This roller may be adjusted up and down relative to the frame sides. This roller helps to stabilize platform 50, and it is necessary if brush 120 is omitted.

What I claim as my invention is:

1. A grass and plant mower comprising a shaft, supporting rollers mounted on and carrying the shaft and shiftable longitudinally thereof, a pair of horizontal relatively reciprocal blades suspended from the shaft, coacting cutting teeth on and projecting forwardly from the blades, a pair of opposed wavy cam wheels rotatably mounted on the shaft, spaced lugs connected to each blade and spanning a cam wheel, the lugs of each blade spanning a different wheel than the lugs of the other blade, said lugs being reciprocated by the cam wheels to reciprocate the blades relative to each other, clutch means on the rollers and the adjacent cam wheels, said clutch means being engaged to cause the rollers to rotate with the cam wheels when the rollers are in a first position on the shaft and being disengaged when said rollers are shifted along the shaft to a second position, and means selectively retaining the rollers in the first and second positions on the shaft.

2. A grass and plant mower comprising a shaft, supporting rollers mounted on and carrying the shaft and shiftable longitudinally thereof, a pair of horizontal relatively reciprocal blades suspended from the shaft, co-acting cutting teeth on and projecting forwardly from the blades, a sleeve rotatably mounted on the shaft, a pair of opposed wavy cam wheels fixedly mounted on the sleeve, means on each blade operatively engaging a cam wheel, the engaging means of each blade engaging a different cam wheel from the one engaged by the engaging means of the other blade, said cam wheels reciprocating the blades laterally relative to each other through the engaging means, clutch means on the rollers and the cam wheels, said clutch means being engaged to cause the rollers to rotate with the cam wheels when the rollers are in a first position on the shaft and being disengaged when said rollers are shifted along the shaft to a second position, and means selectively retaining the rollers in the first and second positions on the shaft.

3. A grass and plant mower as claimed in claim 2 including power means on the mower, and means connecting the power means to the sleeve to rotate the latter.

4. A grass and plant mower as claimed in claim 1 in which the clutch means for each roller comprises a plurality of pins carried by the adjacent cam wheel and extending towards said roller, said roller including a plurality of sockets for the pins, said pins fitting in the sockets when the roller is in the first position on the shaft and being clear of the sockets when the roller is in the second position.

References Cited in the file of this patent

UNITED STATES PATENTS

| | | |
|---|---|---|
| 725,397 | Benson | Apr. 14, 1903 |
| 911,719 | Hake | Feb. 9, 1909 |
| 1,912,493 | Nanstiel | June 6, 1933 |
| 2,155,183 | Dursch | Apr. 18, 1939 |
| 2,453,587 | Petri et al. | Nov. 9, 1948 |
| 2,733,565 | Kearney | Feb. 7, 1956 |
| 2,762,187 | Fortis | Sept. 11, 1956 |